US012803214B2

(12) United States Patent
Englert

(10) Patent No.: US 12,803,214 B2
(45) Date of Patent: Nov. 17, 2026

(54) ELECTRICAL CONNECTOR FOR A RADAR SYSTEM

(71) Applicant: GM Cruise Holdings LLC, San Francisco, CA (US)

(72) Inventor: Dominik Joachim Englert, Erding (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 358 days.

(21) Appl. No.: 18/404,842

(22) Filed: Jan. 4, 2024

(65) Prior Publication Data

US 2025/0183583 A1 Jun. 5, 2025

(30) Foreign Application Priority Data

Nov. 30, 2023 (EP) .................................... 23213191

(51) Int. Cl.

*H01R 13/52* (2006.01)
*G01S 7/02* (2006.01)

(52) U.S. Cl.

CPC .......... *H01R 13/5202* (2013.01); *G01S 7/027* (2021.05); *H01R 2201/20* (2013.01)

(58) Field of Classification Search

CPC .. H01R 13/5202; H01R 2201/20; G01S 7/027
See application file for complete search history.

(56) References Cited

U.S. PATENT DOCUMENTS

| | | | | |
|---|---|---|---|---|
| 11,852,753 | B1 * | 12/2023 | Grossman | G02B 27/0006 |
| 2016/0209249 | A1 | 7/2016 | Lee et al. | |
| 2018/0284047 | A1 * | 10/2018 | Kim | H04M 1/72454 |
| 2019/0302140 | A1 | 10/2019 | Pusheck et al. | |
| 2020/0178411 | A1 * | 6/2020 | Pham | H04M 1/18 |
| 2020/0329289 | A1 | 10/2020 | Kenaley et al. | |
| 2020/0387174 | A1 * | 12/2020 | Diehl | B60W 30/16 |
| 2021/0318159 | A1 * | 10/2021 | Dieterle | G01F 23/284 |
| 2022/0386984 | A1 | 12/2022 | Sarraf et al. | |

OTHER PUBLICATIONS

DE102012201018 (Year: 2013).*
KR20220041175 (Year: 2022).*
European Office Action for European Application No. 23213191.2; dated May 28, 2026; 10 pages.
European Search Report for European Application No. 23213191; dated Mar. 12, 2024; 2 pages.

* cited by examiner

*Primary Examiner* — Reena Aurora
(74) *Attorney, Agent, or Firm* — CANTOR COLBURN LLP

(57) ABSTRACT

A system includes an electrical component, a sensor system, and a connector. The sensor system has a housing with a connector opening and circuitry disposed within the housing. The connector is disposed within the connector opening of the housing of the sensor system and electrically connects the electrical component to the circuitry of the sensor system. The connector includes a vent that allows for movement of air into and out of the housing via the connector opening while preventing moisture from moving into the housing of the sensor system.

20 Claims, 9 Drawing Sheets

ELECTRICAL CONNECTOR FOR A RADAR SYSTEM

RELATED APPLICATION

This application claims priority to European Patent Application No. EP23213191.2, filed on Nov. 30, 2023, and entitled "ELECTRICAL CONNECTOR FOR A RADAR SYSTEM". The entirety of this application is incorporated herein by reference.

BACKGROUND

A sensor system, such as a radar system, a lidar system, a camera system, etc. can be utilized in a variety of contexts where the sensor system is subject to various environmental elements, such as in connection with an autonomous vehicle (AV), in connection with a driver-assistance system of a vehicle, in connection with a security system, etc. Environmental elements include, but are not limited to, rain, snow, water from a water source (such as a car wash), varying temperatures and humidity, etc. Accordingly, the sensor system can be housed within a housing to protect componentry of the sensor system from the environmental elements, where the housing provides for a sealed environment for the housed internal components of the sensor system such that the housed internal components are protected from one or more of the aforementioned environmental elements.

The interior of the housing can become heated or cooled depending on the outside environment in which the sensor system is being used, as well as the use of the internal components within the housing. When the interior of the housing is heated (e.g., due to circuitry in a radar system being active), air within the housing expands. Conversely, as the interior of the housing cools, the air within the housing contracts. This change in air volume can affect sealing of the housing; for example, cracks may develop in a seal employed to seal walls of the housing due to thermal expansion and contraction, thereby undesirably subjecting componentry of the sensor system to the environmental elements referenced above. To prevent such problems from occurring, the housing of the sensor system(s) can include an air vent for receiving a vent component that allows for air to enter and exit the housing, while also preventing moisture from entering the housing. Typically, to apply the air vent to the housing, an aperture is drilled in the housing and the air vent is tightly fit into the aperture. The air vent is then ordered with a custom size from a third-party manufacturer and fit into the aperture. This process is time-consuming, expensive, and risks damage to the housing (and the internal componentry within the housing).

SUMMARY

The following is a brief summary of subject matter that is described in greater detail herein. This summary is not intended to be limiting as to the scope of the claims.

Described herein are various technologies that pertain to an electrical connector for a sensor system, where the electrical connector electrically couples the sensor system to other electrical componentry, such as a computing system. The sensor system can be a radar system, a lidar system, a camera system, or any other suitable sensor system that includes componentry that is desirably protected from environmental elements. The sensor system has a housing with a connector opening and circuitry disposed within the housing, where the circuitry can include antennas, amplifiers, digital signal processors (DSPs), etc. The connector is disposed within the connector opening of the housing of the sensor system and electrically connects the circuitry of the sensor system to other electrical componentry, such as a backplane, a computing system, etc. The connector includes a vent that allows for movement of air into and out of the housing by way of the connector opening while preventing moisture from moving into the housing of the sensor system.

An example electrical connector for a sensor system includes a connector housing, a vent opening extending through a surface of the connector housing, and a membrane covering the vent opening. The connector housing has a first portion for connecting to one or more electrical wires and a second portion for connecting to the sensor system. The membrane allows for movement of air through the vent opening and prevents moisture from moving through the vent opening.

An example method for connecting a computing system to circuitry of a sensor system includes providing the sensor system, where the sensor system includes a housing and circuitry disposed within the housing. The method further includes electrically connecting the circuitry of the sensor system to the computing system by way of an electrical connector, where the electrical connector has a vent for allowing air to move into and out of the housing of the sensor system and preventing moisture from moving into the housing of the sensor system.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later. \

DETAILED DESCRIPTION

Figure 1:
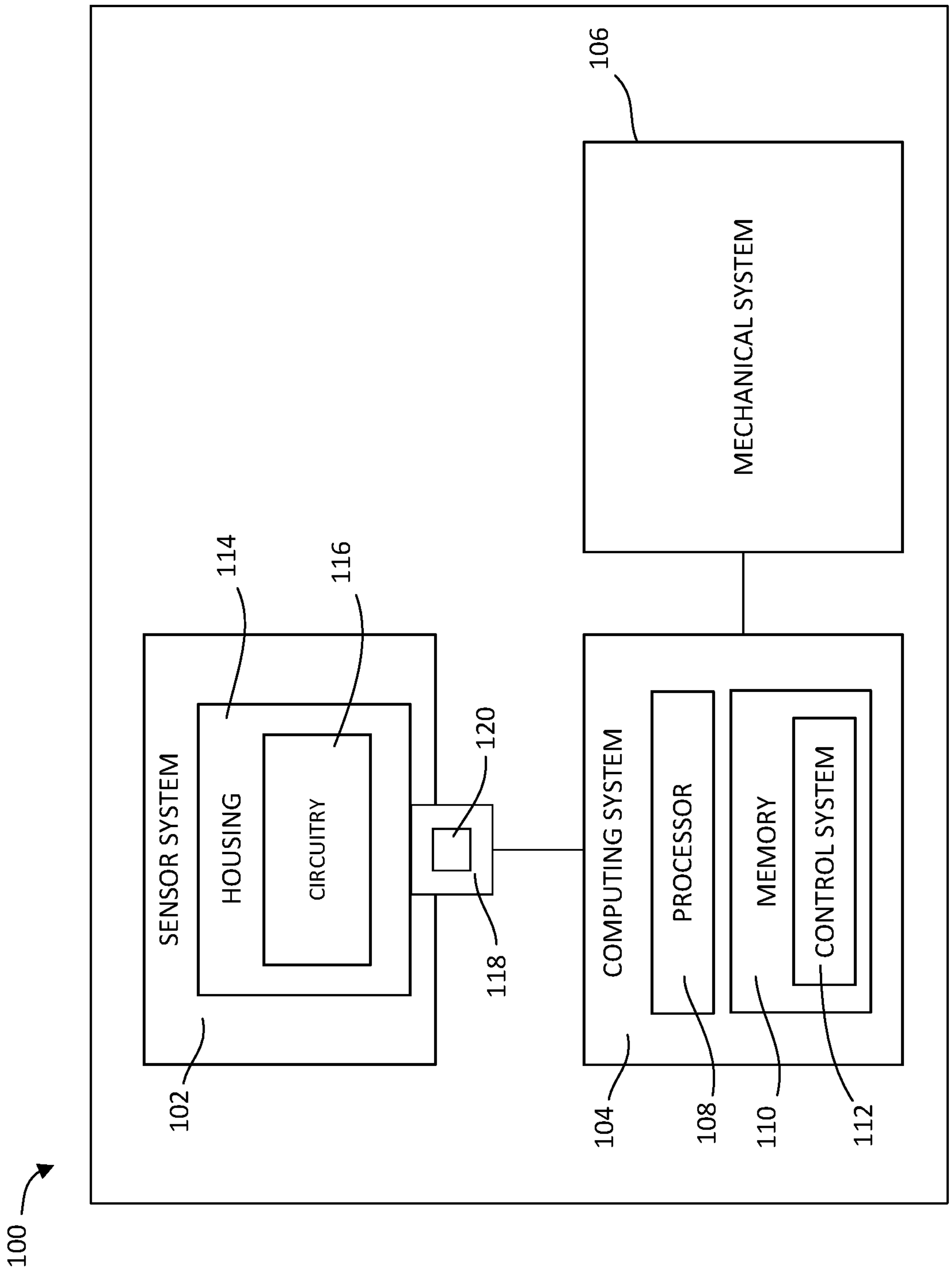
FIG. 1 illustrates a schematic view of an example system that includes a sensor system and a computing system that are electrically connected to one another by way of a vented connector.

The Detailed Description describes exemplary embodiments of the invention and is not intended to limit the scope of the claims in any way. Indeed, the invention is broader than and unlimited by the embodiments disclosed herein, and the terms used in the claims have their full ordinary meaning. Features and components of one disclosed embodiment may be incorporated into the other disclosed embodiments. Inventions within the scope of this application may include additional features, or may have less features, than those shown in the embodiments described herein.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Sensor systems (e.g., radar sensors, a lidar sensors, etc.) employed in platforms, such as autonomous vehicles (AVs)) are sometimes subject to environmental elements (e.g., rain, snow, etc.) or water from a water source (e.g., a car wash). Accordingly, such a sensor system can include a housing that protects internal components (e.g., circuitry) of the sensor system from such elements. However, because these sensor systems may require release and intake of air through the housing (due to the internal components creating heat when energized and cooling when not energized), the housing may need to be vented while also preventing moisture from moving into the housing. Conventional housings for sensor systems include a first aperture that exposes a connection point, where a connector is coupled to the connection point to form an electrical connection between the internal componentry of the sensor and some other system (such as a computing system). Conventional housings for sensor systems also include a second aperture for venting the housing to allow the movement of air in and out of the housing, where a vent plug is separately manufactured to form fit into the second housing, thereby preventing moisture from entering the housing by way of the second aperture but allowing air to pass through the vent plug. When an electrical connector is coupled to connection point, the electrical connector fits snugly into the first aperture to prevent moisture from entering the housing by way of the first aperture. As described above, forming the second aperture, specially manufacturing the vent plug, and fitting the vent plug into the second aperture can add time and expense to the manufacturing of such sensor systems.

Described herein is an electrical connector that is electrically and mechanically coupled to circuitry of a sensor system is operable to electrically couple the circuitry of the sensor system to other electrical componentry, such as a computing system, where the electrical connector allows for venting of a housing of the sensor system when the electrical connector is coupled to the sensor system, thereby eliminating the need for an additional vent opening on the housing of the sensor system. For example, an electrical connector that forms a seal with the housing when mechanically and electrically coupled to the circuitry of the sensor system can include a vent that is configured to allow air to move in and out of the housing through the vent of the electrical connector; the seal formed with the housing prevents moisture from moving into the housing and contacting electrical circuitry of the sensor system. The vent can include a vent opening that extends through a connector housing of the connector and a membrane positioned over the opening that prevents moisture from moving into the electrical connector through the vent opening. Hence, the membrane is permeable to air but not permeable to water or other liquids.

Examples set forth herein relate to a sensor system and the electrical connector being included in an AV; however, the electrical connector and corresponding sensor system can be used in any application in which a housing for holding one or more electrical components needs to be vented. That is, such an electrical connector can be used with any suitable sensor system that includes electrical components, where the electrical components need to be protected from environmental elements while allowing for venting.

Turning now to the drawings, FIG. 1 illustrates a schematic drawing of an example system 100. The system 100, in an example, is an AV, an automobile driven by humans, an airplane, a drone, a watercraft, an outdoor security system, a cellular antenna system, etc. The system 100 can include a sensor system 102, a computing system 104, and optionally a mechanical system 106. While the system 100 is illustrated as including a single sensor system 102 and a single mechanical system 106, it should be understood that the system 100 may include multiple sensor systems and multiple mechanical systems. For instance, the system 100 can include a radar sensor, a lidar sensor, a vision sensor (e.g., a video camera), a sonar sensor, a global positioning system (GPS), and so forth. Similarly, mechanical systems that can be included in the system 100 include a propulsion system (e.g., a combustion engine, an electric motor, a hybrid system, etc.), a braking system, a steering system, and so forth. The computing system 104 is operatively connected to the sensor system 102 and the mechanical system 106. The computing system 104 can include a processor 108 and a memory 110, where a control system 112 is loaded in the memory 110. The control system 112 is configured to control operation of the mechanical system 106 based at least in part upon sensor signals outputted by the sensor system 102.

In the illustrated example, the sensor system 102 includes a housing 114 and circuitry 116 disposed within the housing 114. The housing 114 is configured to protect the circuitry 116 from environmental elements (e.g., rain, snow, etc.) or water from a water source (e.g., a car wash). That is, the sensor system 102 may be positioned on the system 100 such that the sensor system 102 is subject to such elements, and the housing 114 is configured to protect the circuitry 116 and other housed components of the sensor system 102 from such elements. The computing system 102 can be electrically connected to the circuitry 114 by an electrical connector 118 by way of an opening (not shown) in the housing 114. The electrical connector 118 can include a vent 120 that is configured to allow air to move into and out of the housing 114 while also preventing moisture from moving into the housing 114. The electrical connector 118 and vent 120 can take any suitable form that allows for air to move into and out of the housing 114 through the electrical connector while also preventing moisture from moving into the housing 114, such as, for example, any form described herein.

Figure 2:
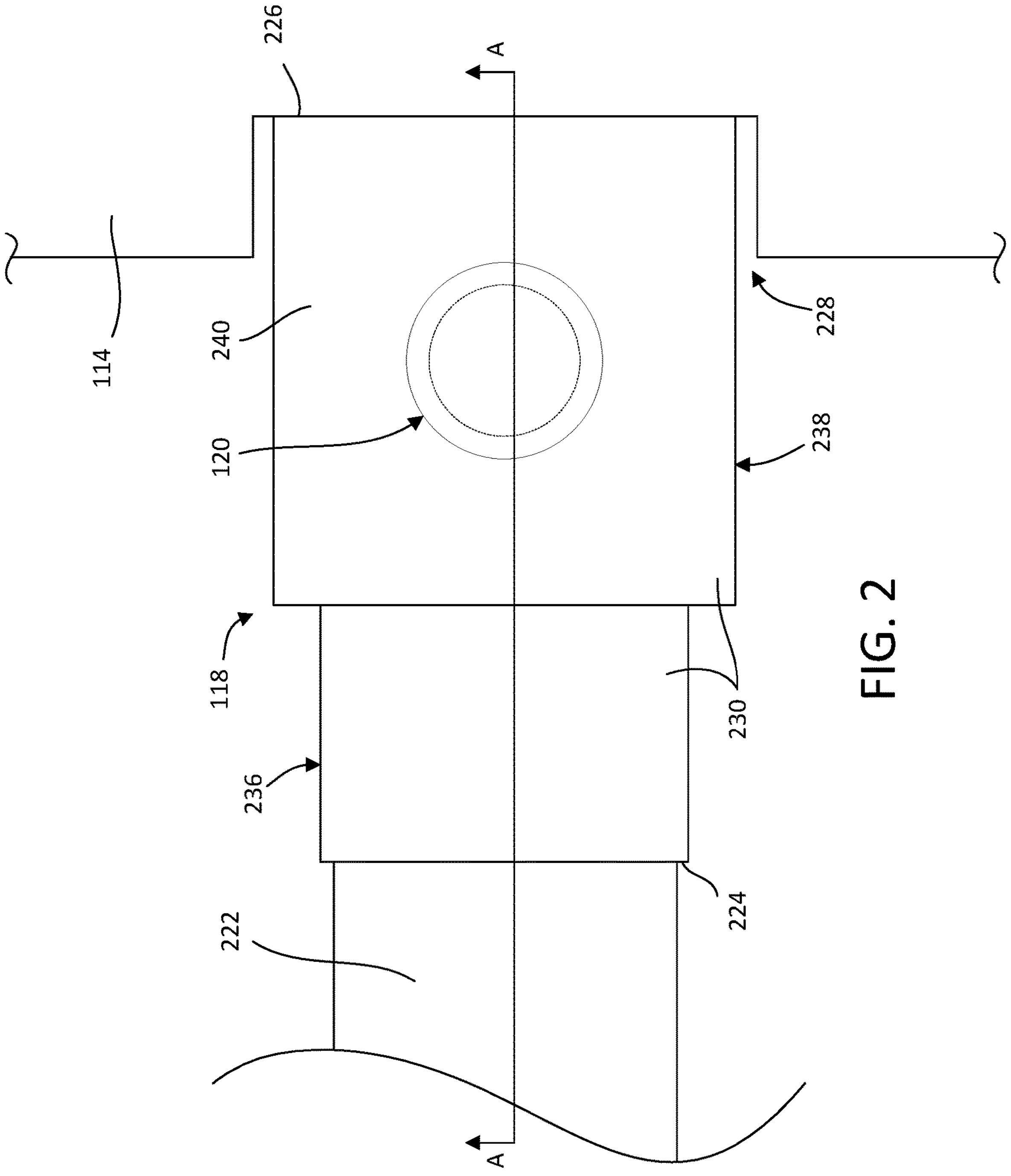
FIG. 2 illustrates a top view of an example electrical connector that is operable to electrically couple a sensor system to other electrical componentry.
Figure 3:
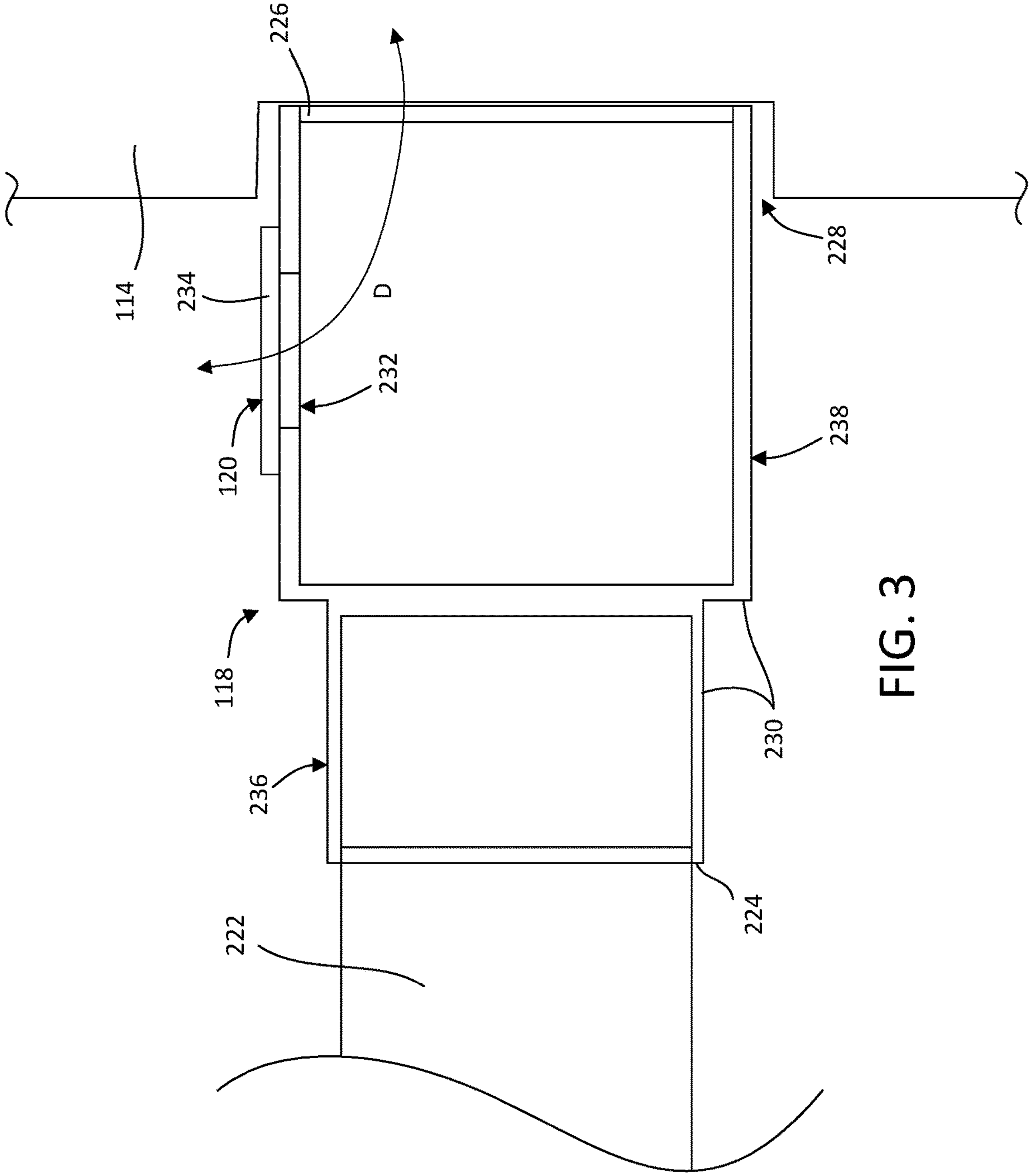
FIG. 3 illustrates a cross-sectional view of the electrical connector of FIG. 2 taken along the line A-A shown in FIG. 2.
Figure 4:
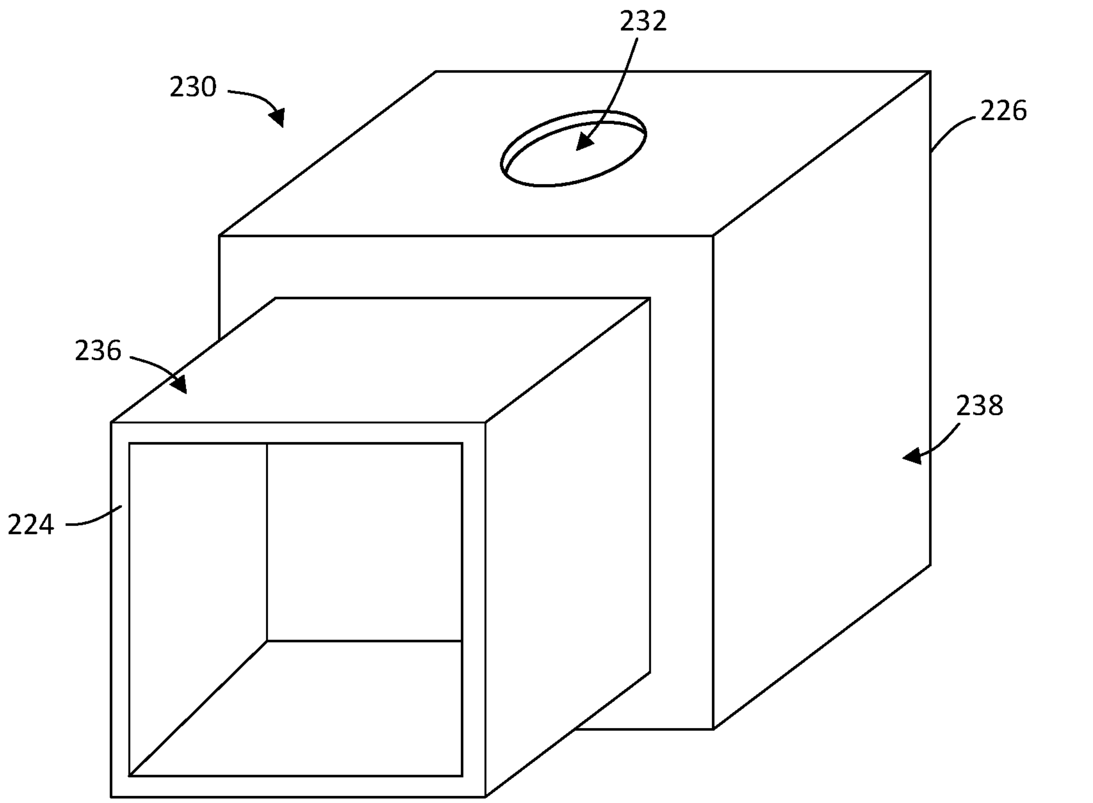
FIG. 4 illustrates a perspective view of an example connector housing for the electrical connector of FIG. 2.
Figure 5:
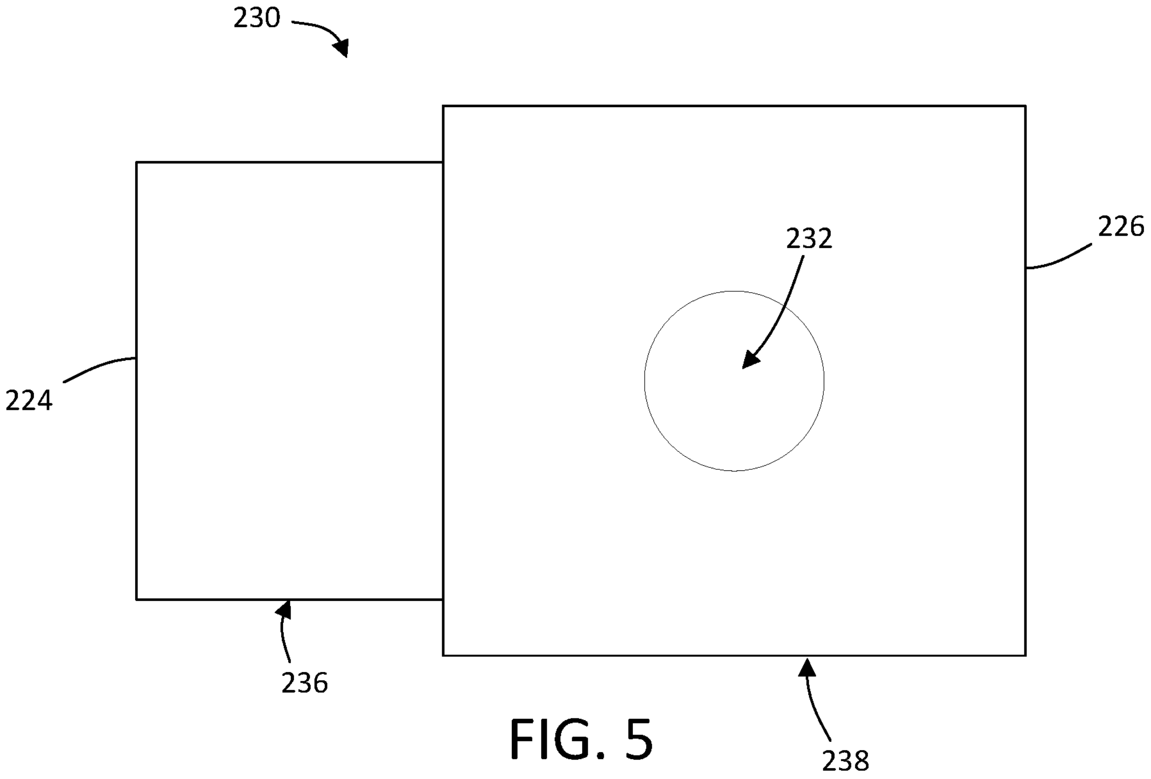
FIG. 5 illustrates a top view of the connector housing of FIG. 3.
Figure 6:
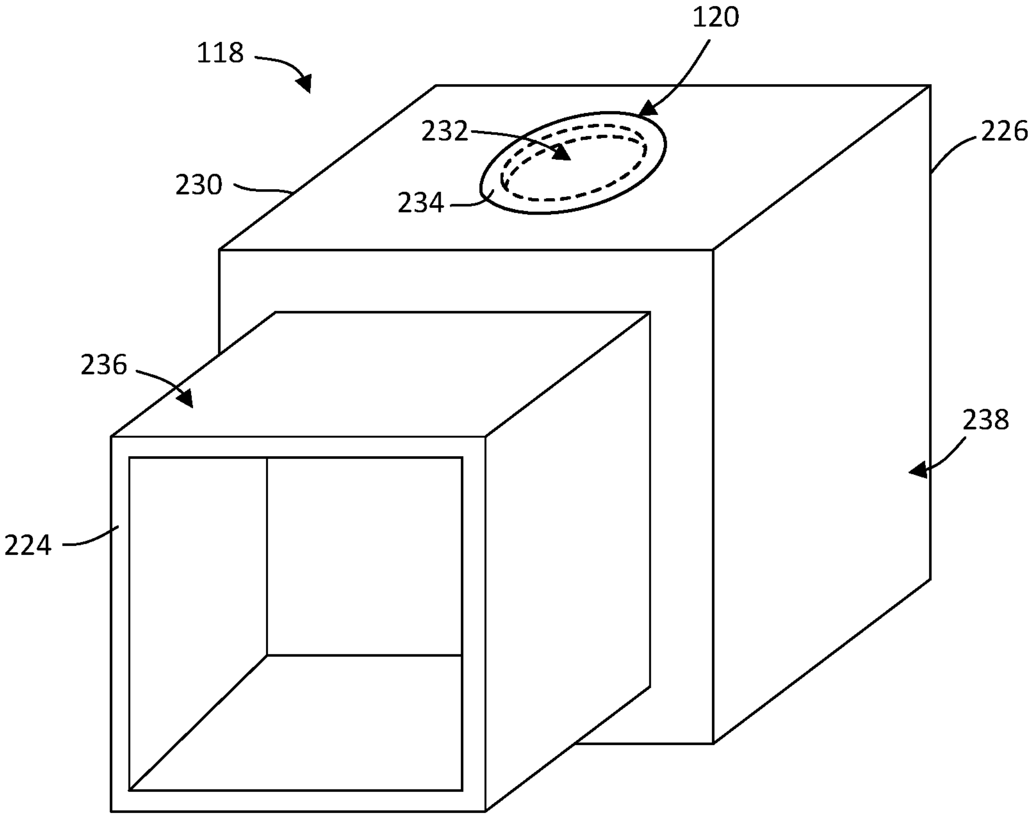
FIG. 6 illustrates a perspective view of the electrical connector of FIG. 2.
Figure 7:
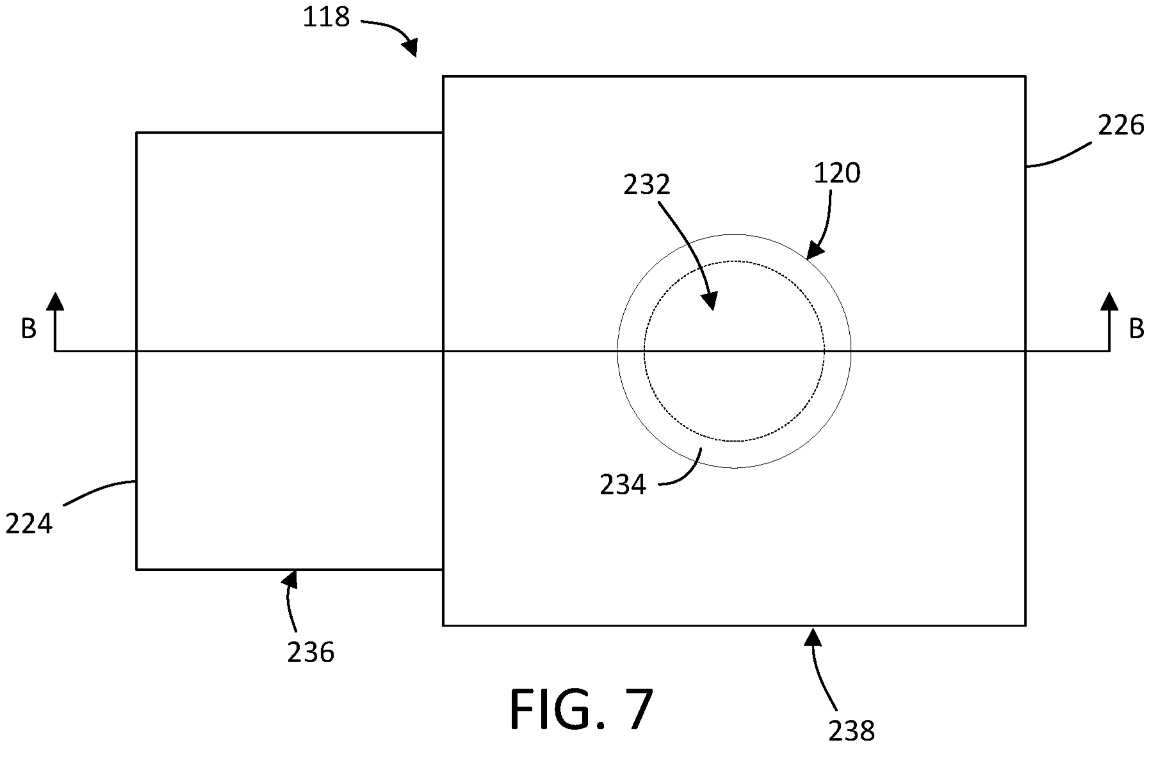
FIG. 7 illustrates a top view of the electrical connector of FIG. 2.

FIGS. 2-9 illustrate an example of the electrical connector 118 that can be used to electrically couple the circuitry 116 of the sensor system 102 to other electrical componentry, such as the computing system 104 by way of, for example, one or more electrical wires 222 (FIGS. 2-3). That is, the connector 118 can have a first end 224 having the one or more wires 222 extending therefrom, where the wires 222 are configured to be electrically connected to other electrical componentry. The connector 118 can have a second end 226 that is configured to be received by a connector opening 228 of the housing 114 such that the one or more wires 222 are electrically connected to circuitry of the sensor system 102 that is disposed within the housing 214. The second end 226 of the connector 118 and the connector opening 228 of the housing 114 can be connected by any suitable means that allows for the one or more wires 222 to be electrically connected to circuitry of the sensor system 102 disposed within the housing 114.

The electrical connector 118 includes a connector housing 230 and the vent 120, where the vent 120 allows for air to move in and out of the housing 114 of the sensor system 102 through the connector opening 228 and further through the connector 118 (e.g., in the direction D shown in FIG. 3) when the electrical connector 118 is connected to the circuitry of the sensor system 102 by way of the connector opening 228. The vent 120 can include a vent opening 232 (FIG. 3) that extends through the connector housing 230 and a membrane 234 that covers the vent opening 232. The membrane 234 can be configured to be permeable to air while being impermeable to moisture. For example, the membrane 234 can be made of expanded polytetrafluoroethylene (ePTFE) or any other suitable material that is capable of being permeable to air and impermeable to moisture.

Figure 8:
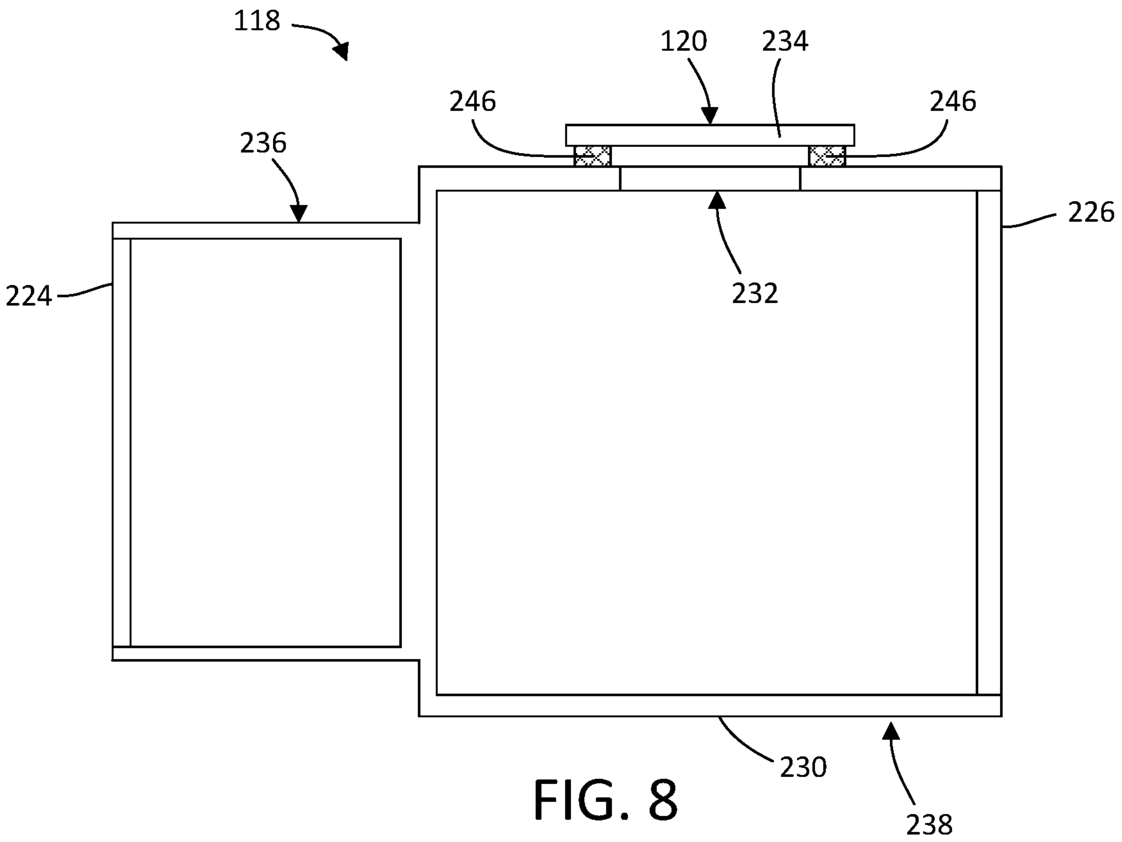
FIG. 8 illustrates a cross-sectional view of the electrical connector of FIG. 2 taken along the line B-B shown in FIG. 7, showing an example connection between a venting membrane and the connector housing.
Figure 9:
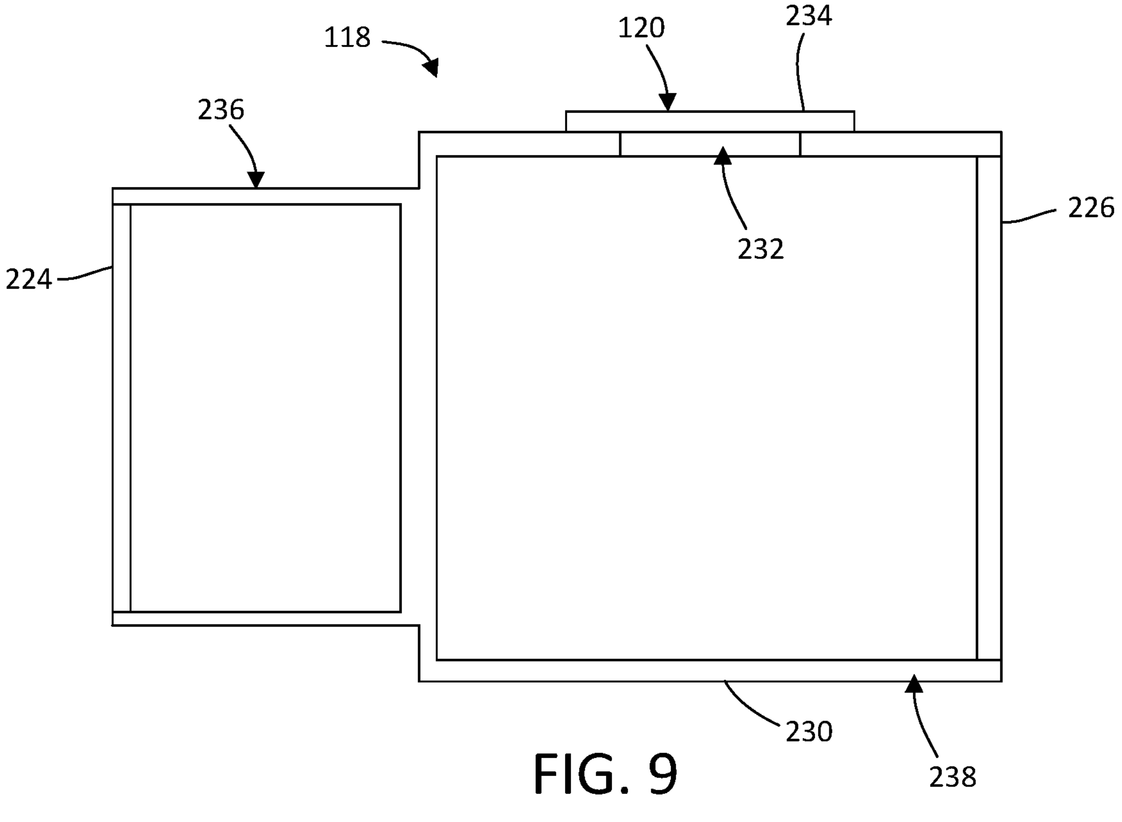
FIG. 9 illustrates a cross-sectional view of the electrical connector of FIG. 2 taken along the line B-B shown in FIG. 7, showing another example connection between a venting membrane and the connector housing.

Referring to FIG. 8, in some implementations, the membrane 234 can be connected to the connector housing 230 by an adhesive 246. Referring to FIG. 9, in some implementations, the membrane 234 can be heat bonded to the connector housing 230. However, it should be understood that the membrane 234 can be connected to the connector housing 230 by any suitable means that allows for the membrane 234 to cover the vent opening 232 and form a mechanical seal with the housing 114 of the sensor system 102.

The connector housing 230 can be made from a plastic material or any other suitable material. In some implementations, the connector housing 230 can be made by injection molding to include the vent opening 232 (i.e., the electrical connector 118 is formed to include the vent opening 232). In some implementations, the vent opening 232 can be made by drilling a hole into the connector housing 230. However, it should be understood that the connector housing 230 can be made by any means that allows for the vent opening 232 to extend through the connector housing 230, such that air can enter and exit the connector housing 230 by way of the vent opening 232.

Figure 10:
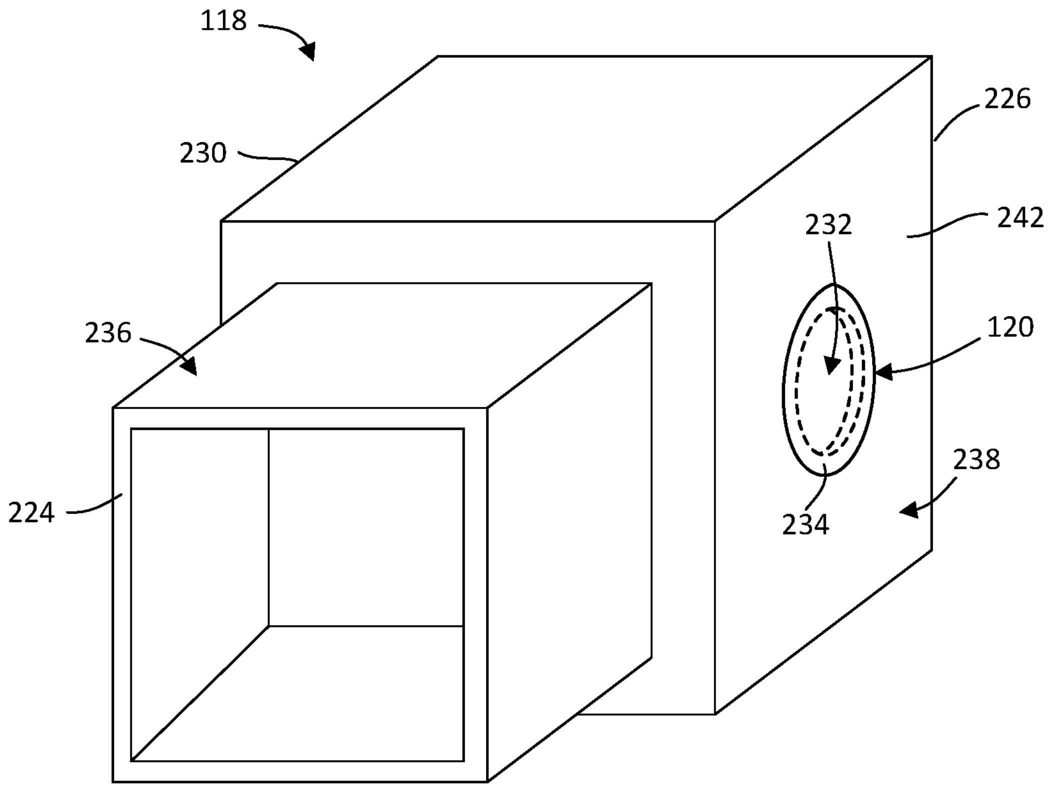
FIG. 10 illustrates a perspective view of another example electrical connector.
Figure 11:
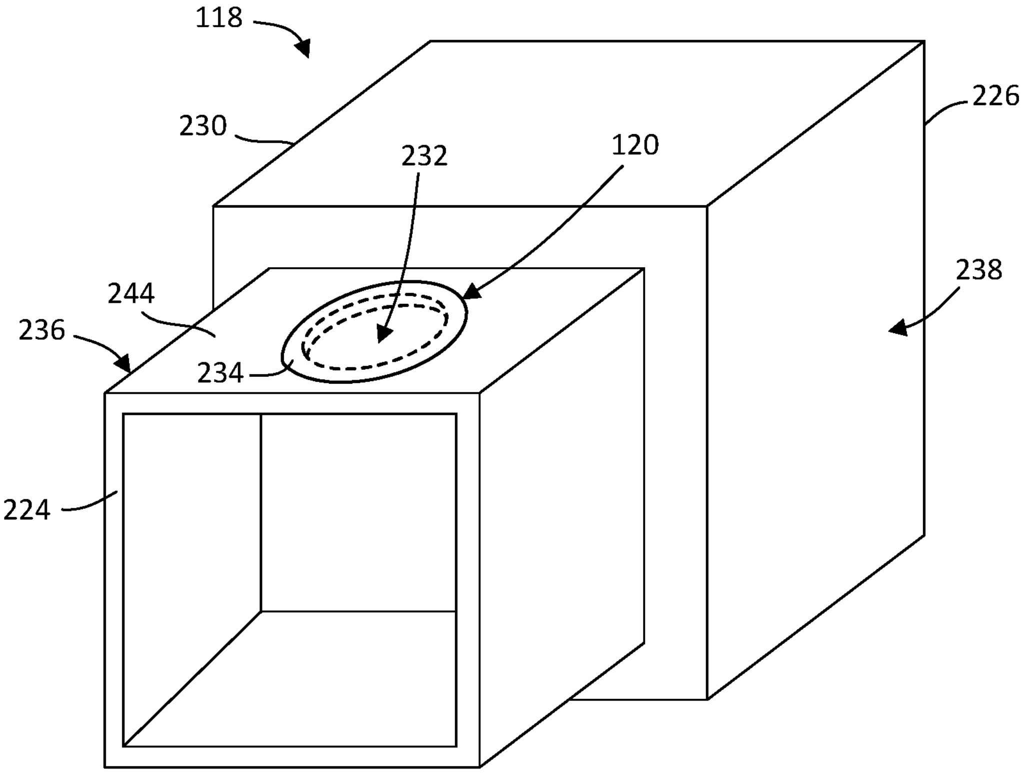
FIG. 11 illustrates a perspective view of another example electrical connector.

Referring to FIGS. 2-9, the connector housing 230 can include a first portion 236 for holding the one or more wires 222 (FIGS. 2-3) and a second portion 238 for connecting to the connector opening 228 (FIGS. 2-3) of the housing 114 (FIGS. 2-3) of the sensor system 102, where the first portion 236 includes the first end 224 of the connector 218 and the second portion 238 includes the second end 226 of the connector 118. In the illustrated implementation, the connector 118 includes a single vent 120 positioned on a top surface 240 of the second portion 238 of the connector housing 230. However, it should be understood that vent 120 can be positioned at any location on the connector housing 230 that allows for air to move into and out of the housing 114 of the sensor system 102 by way of the electrical connector 218 when the connector 218 is connected to the sensor system 102. For example, referring to FIG. 10, the vent 120 can be positioned on a side surface 242 of the second portion 238 of the connector housing 230. In some implementations, referring to FIG. 11, the vent 120 can be positioned on the first portion 236 of the connector housing 230. In this example, the vent 120 is positioned on a top surface 244 of the first portion 236 of the connector housing 230, but it should be understood that the vent 120 can be positioned at any other location on the first portion 236 that allows for air to move in and out of the housing 214 of the sensor system.

In the illustrated example, the connector 118 includes a connector housing 230 having a first portion 236 and a second portion 238, but it should be understood that the connector 118 can take any suitable form that allows for other electrical componentry to be electrically connected to circuitry disposed within a housing of a sensor system while also including a vent that allows air to move into and out of the sensor system housing (by way of the electrical connector) when the connector is attached to the sensor system. In addition, the connector 118 is shown as having a single vent 120, but it should be understood that the connector 118 can have any suitable number of vents 120 that allow for air to move into and out of the sensor system housing by way of the connector 118. For example, the connector 118 can have two or more vents, three or more vents, four or more vents, etc. Also, it should be understood that implementations of the connector 118 that include a plurality of vents 120 can have vents positioned at any suitable location on the connector 118 that allows air to move into and out of the sensor system housing by way of the connector 118 when the connector 118 is attached to the sensor system.

In the illustrated examples, the membrane 234 is described as allowing air to move both into and out of the vent opening 232. However, in some instances, the membrane 234 of the vent 120 can be configured to allow for the movement of air in one direction through the vent opening 232 while preventing movement of air in the other direction through the vent opening 232.

Figure 12:
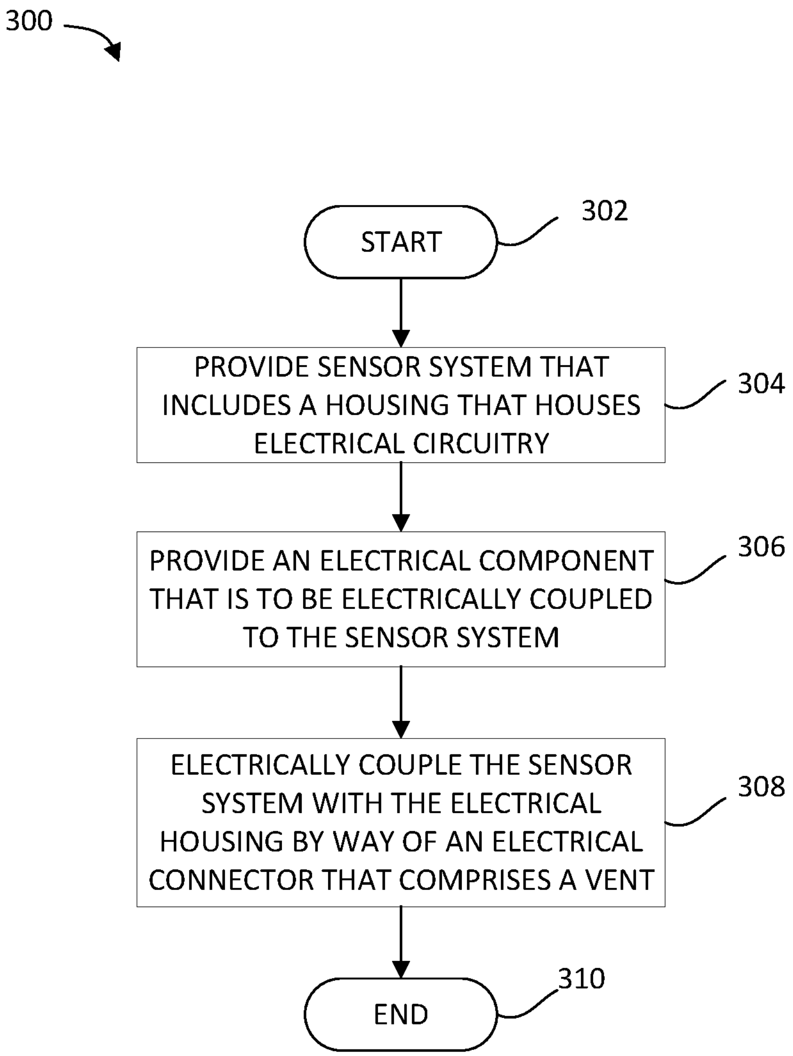
FIG. 12 illustrates an example method of connecting a computing system of an AV to circuitry of a sensor system of the AV.

FIG. 12 illustrates a method 300 relating to venting a housing of a sensor system by way of a vent in an electrical connector. While the method 300 is shown and described as being a series of acts that are performed in a sequence, it is to be understood and appreciated that the method is not limited by the order of the sequence. For example, some acts can occur in a different order than what is described herein. In addition, an act can occur concurrently with another act. Further, in some instances, not all acts may be required to implement a methodology described herein.

The method 300 starts at 302, and at 304 a sensor system is provided, where the sensor system includes a housing that houses electrical circuitry. As noted above, the sensor system can be a radar system, although other types of sensor systems are contemplated. The housing of the sensor system can be at least partially formed of metal, of plastic, of some combination thereof, etc. Further, the housing includes an aperture that is configured to receive a male end of a connector, where the connector and the housing of the sensor system form a seal that is generally impermeable to water when the connector mechanically and electrically coupled to the circuitry of the sensor system.

At 306, an electrical component is provided, where the electrical component is to be electrically coupled to the sensor system. The electrical component can be a computer system, another sensor system (e.g., another radar system coupled in a daisy chain arrangement with the sensor system), etc.

At 308, the sensor system is electrically coupled to the electrical component by way of an electrical connector, where the electrical connector comprises a vent that allows air to enter and exit the electrical connector by way of the vent, and further where air can enter and exit the housing by way of the electrical connector. The vent can include an aperture in housing of the electrical connector and a membrane that covers the aperture, where the membrane is mechanically sealed to the housing of the electrical connector. In an example, the electrical connector is formed of a plastic. The method 300 completes at 310.

Various features are described herein according to at least the following examples:

(A1) In an aspect, a system includes an electrical component and a sensor system. The sensor system includes a housing having a connector opening. The sensor system further includes circuitry disposed within the housing. The system also includes a connector disposed within the connector opening of the housing of the sensor system. The connector electrically connects the electrical component to the circuitry of the sensor system. The connector includes a vent that allows for movement of air into and out of the housing of the radar system by way of the connector opening while preventing moisture from moving into the housing of the sensor system.

(A2) In some embodiments of the system of (A1), the connector includes a connector housing. Further, the vent includes a vent opening extending through the connector housing. The vent also includes a membrane covering the vent opening, wherein the membrane is configured to allow for the movement of air into and out of the housing by way of the connector opening of the housing of the sensor system while preventing moisture from moving into the housing of the sensor system.

(A3) In some embodiments of the system of (A2), the membrane comprises ePTFE.

(A4) In some embodiments of the system of at least one of (A2)-(A3), the membrane is attached to the connector housing by an adhesive.

(A5) In some embodiments of the system of at least one of (A2)-(A3), the membrane is heat bonded to the connector housing.

(A6) In some embodiments of the system of at least one of (A2)-(A5), the connector housing includes a first portion for receiving one or more wires that are electrically connected to the computing system and a second portion that is connected to the sensor system, and wherein the vent is disposed on the second portion of the connector housing.

(A7) In some embodiments of the system of (A6), the vent is disposed on a top surface of the second portion of the connector housing.

(A8) In some embodiments of the system of at least one of (A1)-(A7), the connector includes a second vent that allows for movement of air into and out of the housing via the connector opening while preventing moisture from moving into the housing of the sensor system.

(A9) In some embodiments of the system of at least one of (A1)-(A8), the sensor system is a radar system.

(A10) In some embodiments of the system of at least one of (A1)-(A9), the system also includes a mechanical system that is operatively coupled to the electrical component, wherein the electrical component is configured to control operation of the mechanical system based at least in part upon sensor signals outputted by the sensor system.

(B1) In another aspect, an electrical connector for a sensor system includes a connector housing having a first portion and a second portion, the first portion for connecting to one or more electrical wires, the second portion for connecting to the sensor system. The electrical connector also includes a vent opening extending through a surface of the connector housing. The electrical connector further includes a membrane covering the vent opening, wherein the membrane allows for movement of air through the vent opening and prevents moisture from moving through the vent opening.

(B2) In some embodiments of the electrical connector of (B1), the connector housing includes a plastic material.

(B3) In some embodiments of the electrical connector of at least one of (B1)-(B2), the membrane comprises ePTFE.

(B4) In some embodiments of the electrical connector of at least one of (B1)-(B3), the membrane is attached to the connector housing by an adhesive.

(B5) In some embodiments of the electrical connector of at least one of (B1)-(B3), the membrane is heat bonded to the connector housing.

(B6) In some embodiments of the electrical connector of at least one of (B1)-(B5), the vent opening extends through the second portion of the connector housing.

(C1) In yet another aspect, a method for connecting an electrical component to circuitry of a sensor system includes: 1) providing the electrical component; 2) providing the sensor system, where the sensor system includes a housing and circuitry disposed within the housing; and 3) electrically connecting the circuitry of the sensor system to the electrical component by way of an electrical connector, wherein the electrical connector has a vent that allows air to move into and out of the housing of the sensor system by way of the electrical connector and that prevents moisture from moving into the housing of the sensor system.

(C2) In some embodiments of the method of (C1), the electrical connector comprises a connector housing, and the vent includes: a) a vent opening extending through the connector housing; and b) a membrane covering the vent opening, wherein the membrane is configured to allow air to move into and out of the connector housing and prevents moisture from moving into the housing of the connector housing.

(C3) In some embodiments of the method of (C2), the membrane comprises ePTFE.

(C4) In some embodiments of the method of at least one of (C1)-(C3), the sensor system is a radar sensor system.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising:

an electrical component;

a sensor system, comprising:

a sensor housing having a connector opening; and circuitry disposed within the sensor housing; and a connector disposed within the connector opening of the sensor housing of the sensor system, wherein the connector electrically connects the electrical component to the circuitry of the sensor system, and wherein the connector comprises a connector housing defining an interior volume and a vent extending from a vent opening defined in an external surface of the connector housing to the interior volume, a membrane being disposed upon the external surface and arranged to cover the vent opening, wherein the membrane is attached to the external surface to form a seal around a perimeter of the vent opening, wherein the membrane comprises a material configured to be permeable to air and impermeable to liquids such that the vent allows for movement of air into and out of the housing of the sensor system by way of the connector opening while preventing liquid from moving into the housing of the sensor system.

2. The system according to claim 1, wherein the connector further comprises:

the connector opening of the sensor housing being in fluid communication with the interior of the connector housing and an interior of the sensor housing of the sensor system such that air may move in and out of the interior of the sensor housing of the sensor system while liquids are prevented from moving into the interior of the sensor housing of the sensor system.

3. The system according to claim 2, wherein the membrane comprises a perfluoroalkyl and a polyfluoroalkyl.

4. The system according to claim 2, wherein the membrane is attached to the connector housing by an adhesive.

5. The system according to claim 2, wherein the membrane is heat bonded to the connector housing.

6. The system according to claim 2, wherein the connector housing comprises a first portion for receiving one or more wires that are electrically connected to a computing system and a second portion that is connected to the sensor system, and wherein the vent is disposed on the second portion of the connector housing.

7. The system according to claim 6, wherein the vent is disposed on a top surface of the second portion of the connector housing.

8. The system according to claim 1, wherein the connector comprises a second vent extending from a second vent opening defined in the external surface of the connector housing to the interior volume having a second membrane being disposed upon the external surface and arranged to cover the vent opening and made from the a material configured to be permeable to air and impermeable to liquids such that the second vent allows for movement of air into and out of the sensor housing via the connector opening while preventing moisture from moving into the sensor housing of the sensor system.

9. The system according to claim 1, wherein the sensor system is a radar system.

10. The system according to claim 1, further comprising a mechanical system that is operatively coupled to the electrical component, wherein the electrical component is configured to control operation of the mechanical system based at least in part upon sensor signals outputted by the sensor system.

11. An electrical connector for a sensor system, the electrical connector comprising:

a connector housing having a first portion and a second portion, the first portion for connecting to one or more electrical wires, the second portion for connecting to the sensor system;

a vent extending from a vent opening defined in an exterior surface of the second portion of the connector housing to an interior of the second portion; and a membrane disposed upon and attached to the exterior surface of the second portion of the connector housing, the membrane being arranged to cover the vent opening and sealed around a perimeter of the vent opening, wherein the membrane comprises a material configured to be permeable to air and impermeable to liquids such that the vent opening allows for movement of air through the vent opening and prevents liquids from moving through the vent opening.

12. The electrical connector according to claim 11, wherein the connector housing comprises a plastic material.

13. The electrical connector according to claim 11, wherein the membrane comprises expanded polytetrafluoroethylene.

14. The electrical connector according to claim 11, wherein the membrane is attached to the connector housing by an adhesive.

15. The electrical connector according to claim 11, wherein the membrane is heat bonded to the connector housing.

16. The electrical connector according to claim 11, wherein the vent opening extends through the second portion of the connector housing.

17. A method for connecting an electrical component to circuitry of a sensor system, the method comprising:

providing the electrical component;

providing the sensor system, where the sensor system includes a sensor housing and circuitry disposed within the sensor housing; and electrically connecting the circuitry of the sensor system to the electrical component by way of an electrical connector, wherein the electrical connector has a connector housing defining an interior volume and a vent extending from a vent opening defined in an external surface of the connector housing to the interior volume, a membrane being disposed upon the external surface and arranged to cover the vent opening, wherein the membrane is attached to the external surface to form a seal around a perimeter of the vent opening and the membrane comprises a material configured to be permeable to air and impermeable to liquids such that the vent allows air to move into and out of the sensor housing of the sensor system by way of the electrical connector and that prevents liquids from moving into the sensor housing of the sensor system.

18. The method according to claim 17, wherein the electrical connector further comprises:

the connector opening of the sensor housing being in fluid communication with the interior of the connector housing and an interior of the sensor housing and prevents moisture from moving into the housing of the connector housing.

19. The method according to claim 18, wherein the membrane comprises expanded polytetrafluoroethylene.

20. The method according to claim 17, wherein the sensor system is a radar sensor system.

* * * * *